US009698963B2

(12) United States Patent
Luo et al.

(10) Patent No.: US 9,698,963 B2
(45) Date of Patent: Jul. 4, 2017

(54) METHOD AND APPARATUS FOR SCHEDULING USER EQUIPMENT ON FULL-DUPLEX CELLULAR NETWORK

(71) Applicant: Huawei Technologies Co., Ltd., Shenzhen (CN)

(72) Inventors: Long Luo, Shenzhen (CN); Xiufeng Wu, Langfang (CN); Linjun Lv, Shenzhen (CN); Qing Wang, Reading (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 14/804,581

(22) Filed: Jul. 21, 2015

(65) Prior Publication Data
US 2015/0327293 A1 Nov. 12, 2015

Related U.S. Application Data

(63) Continuation of application No. PCT/CN2013/089784, filed on Dec. 18, 2013.

(30) Foreign Application Priority Data

Jan. 21, 2013 (CN) .......................... 2013 1 0021621

(51) Int. Cl.
H04L 5/14 (2006.01)
H04W 24/02 (2009.01)
H04W 72/12 (2009.01)

(52) U.S. Cl.
CPC .............. *H04L 5/14* (2013.01); *H04W 24/02* (2013.01); *H04W 72/12* (2013.01); *H04W 72/1263* (2013.01)

(58) Field of Classification Search
None
See application file for complete search history.

(56) References Cited

U.S. PATENT DOCUMENTS

2007/0004420 A1  1/2007  Reudink
2009/0135748 A1  5/2009  Lindoff et al.
(Continued)

FOREIGN PATENT DOCUMENTS

CN  101258759 A  9/2008
CN  101997583 A  3/2011
(Continued)

*Primary Examiner* — Gary Mui
(74) *Attorney, Agent, or Firm* — Slater Matsil, LLP

(57) ABSTRACT

The present invention discloses a method for scheduling user equipment on a full-duplex cellular network, including: determining a pairing set for each piece of user equipment in a cell, where a pairing parameter of the piece of user equipment and any piece of user equipment that is in the pairing set of the piece of user equipment meets a preset threshold; and selecting, when a piece of user equipment is scheduled to perform data transmission, another piece of user equipment from a pairing set of the piece of user equipment to perform data transmission in an opposite direction. Embodiments of the present invention further provide a corresponding apparatus. According to the technical solution of the present invention, existing spectrum resources can be utilized more thoroughly and spectrum utilization efficiency of wireless access can be improved.

15 Claims, 3 Drawing Sheets

(56) References Cited

U.S. PATENT DOCUMENTS

| | | | | |
|---|---|---|---|---|
| 2010/0259449 | A1* | 10/2010 | Abbasfar | H04B 7/0619 |
| | | | | 342/394 |
| 2011/0044272 | A1 | 2/2011 | Cui et al. | |
| 2013/0194984 | A1* | 8/2013 | Cheng | H04W 72/082 |
| | | | | 370/294 |
| 2014/0169232 | A1* | 6/2014 | Aggarwal | H04L 5/14 |
| | | | | 370/277 |
| 2014/0169234 | A1* | 6/2014 | Zhu | H04W 72/082 |
| | | | | 370/277 |

FOREIGN PATENT DOCUMENTS

| | | |
|---|---|---|
| CN | 102104947 A | 6/2011 |
| CN | 102186212 A | 9/2011 |
| CN | 103781181 A | 5/2014 |
| EP | 2793523 A1 | 10/2014 |
| GB | 2485387 A | 5/2012 |
| WO | 2007137191 A2 | 11/2007 |

* cited by examiner

METHOD AND APPARATUS FOR SCHEDULING USER EQUIPMENT ON FULL-DUPLEX CELLULAR NETWORK

This application is a continuation of International Application No. PCT/CN2013/089784, filed on Dec. 18, 2013, which claims priority to Chinese Patent Application No. 201310021621.3, filed on Jan. 21, 2013, all of which are hereby incorporated by reference in their entireties.

TECHNICAL FIELD

The present invention relates to the field of communications technologies, and in particular, to a method and an apparatus for scheduling user equipment on a full-duplex cellular network.

BACKGROUND

With the development of science and technology, available spectrum resources are decreasing. During exploitation of new spectrum resources, how to improve spectrum utilization efficiency is also an important research and development direction in the prior art.

According to an existing full-duplex technology, data can be received and sent on one spectrum resource simultaneously by using a self-interference cancellation technology, thereby implementing bidirectional communication in a single frequency band and greatly improving the spectrum utilization efficiency. In a cell of an existing full-duplex cellular network, one spectrum resource is generally used to schedule only uplink or downlink data transmission of one piece of user equipment at a same time, and therefore, a spectrum utilization rate is limited and increasing demands for spectrum utilization still cannot be met.

SUMMARY

In view of this, embodiments of the present invention provide a method and an apparatus for scheduling user equipment on a full-duplex cellular network, so as to utilize spectrum resources more thoroughly and improve spectrum utilization efficiency of wireless access, thereby resolving a technical problem that the prior art cannot meet increasing demands for spectrum utilization.

Therefore, embodiments of the present invention provide the following technical solution:

A method for scheduling user equipment on a full-duplex cellular network is provided, including: determining a pairing set for each piece of user equipment in a cell, where a pairing parameter of the piece of user equipment and any piece of user equipment that is in the pairing set of the piece of user equipment meets a preset threshold; and selecting, when a piece of user equipment is scheduled to perform data transmission, another piece of user equipment from a pairing set of the piece of user equipment to perform data transmission in an opposite direction.

An apparatus for scheduling user equipment on a full-duplex cellular network is provided, including a configuration module configured to determine a pairing set for each piece of user equipment in a cell, where a pairing parameter of the piece of user equipment and any piece of user equipment that is in the pairing set of the piece of user equipment meets a preset threshold. A scheduling module is configured to select, when a piece of user equipment is scheduled to perform data transmission, another piece of user equipment from a pairing set of the piece of user equipment to perform data transmission in an opposite direction.

The technical solution used in the embodiments of the present invention is as follows: a pairing set is configured for user equipment. When a piece of user equipment is scheduled to perform data transmission, another piece of user equipment is selected from a pairing set of the piece of user equipment to perform data transmission in an opposite direction, so that existing spectrum resources can be utilized more thoroughly and spectrum utilization efficiency of wireless access can be improved.

DETAILED DESCRIPTION OF ILLUSTRATIVE EMBODIMENTS

Embodiments of the present invention provide a method for scheduling user equipment on a full-duplex cellular network, and according to the method, spectrum resources can be utilized more thoroughly and spectrum utilization efficiency of wireless access can be improved, thereby resolving a technical problem that the prior art cannot meet increasing demands for spectrum utilization. The embodiments of the present invention further provide a corresponding apparatus. The following separately describes the method and apparatus in detail.

Figure 1:
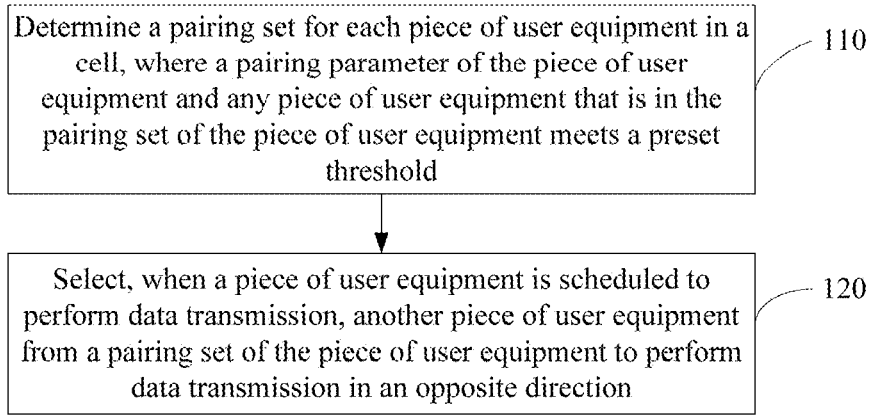
FIG. 1 is a flowchart of a method for scheduling user equipment on a full-duplex cellular network according to an embodiment of the present invention.

Referring to FIG. 1, an embodiment of the present invention provides a method for scheduling user equipment on a full-duplex cellular network, where the method includes:

110. Determine a pairing set for each piece of user equipment in a cell, where a pairing parameter of the piece of user equipment and any piece of user equipment that is in the pairing set of the piece of user equipment meets a preset threshold.

This embodiment of the present invention is applied to the full-duplex cellular network, where a full-duplex technology is used on a base station side of the network, so that interference cancellation of a transmitted signal can be implemented in a signal receiving process, thereby implementing simultaneous receiving and sending of signals of a same frequency.

One cell includes multiple pieces of user equipment (UE), and degrees of interference between these pieces of user equipment are different. In this embodiment, a pairing parameter is designed according to the degrees of the interference between the pieces of user equipment, and two pieces of user equipment whose pairing parameter meets the threshold is configured into a pairing set of each other. A degree of interference between a piece of user equipment and another piece of user equipment that is in a pairing set of the piece of user equipment is relatively small.

For example, assuming that a degree of mutual interference between user equipment UE1 and each piece of user equipment in user equipment UEx, UEy, and UEz is relatively small and a pairing parameter of UE1 and each piece of user equipment in the UEx, UEy, and UEz exceeds the preset threshold, the UEx, UEy, and UEz may be configured into a pairing set of the UE1, which is denoted by UE1<UEx, UEy, UEz>.

In a specific application, only one pairing set may be configured for the user equipment, or according to a difference between uplink and downlink, when the pairing parameter is relative to uplink and downlink, a different uplink pairing subset and downlink pairing subset may be separately configured for the user equipment according to an uplink pairing parameter and a downlink pairing parameter. The pairing set may only include either of the uplink pairing subset or the downlink pairing subset, or may include both.

120. Select, when a piece of user equipment is scheduled to perform data transmission, another piece of user equipment from a pairing set of the piece of user equipment to perform data transmission in an opposite direction.

When a piece of user equipment is scheduled on the base station side to perform data transmission, because a degree of mutual interference between the piece of user equipment and another piece of user equipment that is in a pairing set of the piece of user equipment is relatively small, another piece of user equipment may be selected from the pairing set of the piece of user equipment to perform data transmission in an opposite direction without resulting in mutual interference, so as to improve spectrum utilization efficiency.

Figure 2:
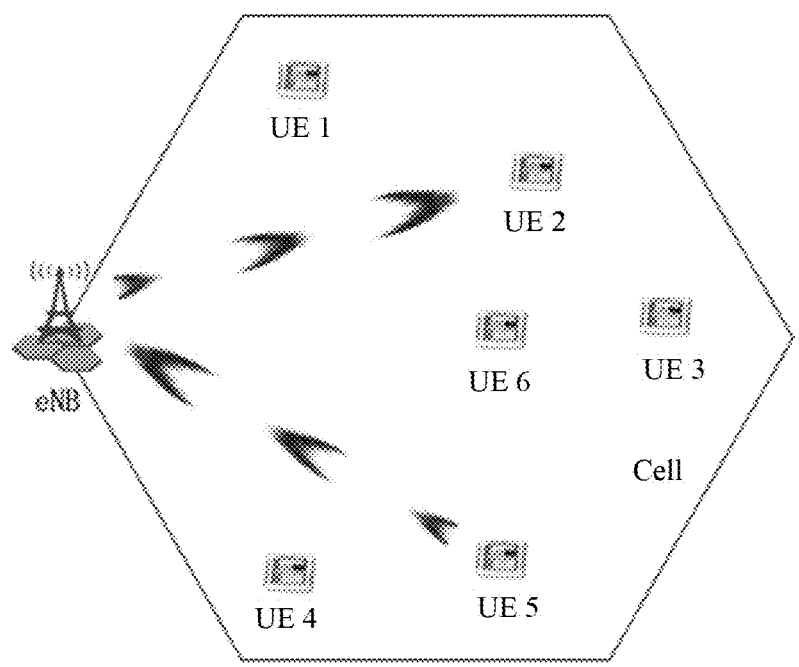
FIG. 2 is a schematic diagram of scheduling user equipment to perform data transmission according to an embodiment of the present invention.

For example, as shown in FIG. 2, assuming that UE5 is in a pairing set of UE2, when a base station (eNB) schedules UE2 to perform downlink data transmission, UE5 may be selected to perform uplink data transmission.

In a specific application, if a pairing set includes an uplink pairing subset and a downlink pairing subset, a specific scheduling manner may be as follows: when a piece of user equipment is scheduled to perform downlink data transmission, another piece of user equipment is selected from an uplink pairing subset of the piece of user equipment to perform uplink data transmission; or when a piece of user equipment is scheduled to perform uplink data transmission, another piece of user equipment is selected from a downlink pairing subset of the piece of user equipment to perform downlink data transmission.

In the foregoing description, this embodiment of the present invention provides a method for scheduling user equipment on a full-duplex cellular network, where a technical solution used in the method is as follows: a pairing set is configured for the user equipment, and when a piece of user equipment is scheduled to perform data transmission, another piece of user equipment is selected from a pairing set of the piece of user equipment to perform data transmission in an opposite direction, so that existing spectrum resources can be utilized more thoroughly and spectrum utilization efficiency of wireless access can be improved.

In an implementation manner, in 110, the determining a pairing set for each piece of user equipment in a cell may specifically include: acquiring an angle of arrival of each piece of user equipment in the cell, calculating a difference between angles of arrival of any two pieces of user equipment, and using the difference as a pairing parameter of the two pieces of user equipment.

Figure 3:
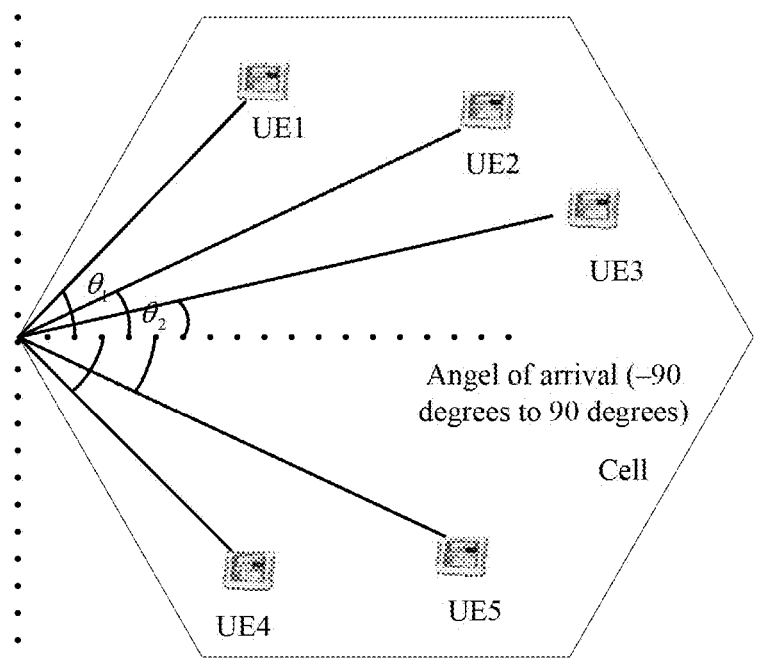
FIG. 3 is a schematic diagram of an angle of arrival of user equipment.

As shown in FIG. 3, the angle of arrival is a measurement of a wave radiation propagation direction from user equipment to an observation point such as a base station, and is generally an included angle between a wave ray and a direction such as a horizontal plane or a normal line of a horizontal plane; in this embodiment, the angle of arrival is represented by θ, and has a value interval from −90 degrees to 90 degrees.

Assuming that angles of arrival of UE1, UE2, . . . , and UEn are $\theta_1, \theta_2, \ldots \theta_n$ respectively, differences between the angle of arrival of UE1 and the angles of arrival of the other UE are: $|\theta_1-\theta_2|, \ldots, |\theta_1-\theta_n|\theta_1, \theta_2, \ldots \theta_n$ respectively, and a value range of the differences is from 0 degrees to 180 degrees. In this embodiment, the differences between the angles of arrival are used as pairing parameters, and a threshold $\theta_{threshold}$ is preset; if a difference between an angle of arrival of a UE and the angle of arrival of UE1 is greater than or equal to the threshold $\theta_{threshold}$, the UE is configured into a pairing set of UE1.

In an implementation manner, in 110, the determining a pairing set for each piece of user equipment in a cell may specifically include: acquiring a first reference power of each piece of user equipment in the cell relative to a base station, calculating a difference between first reference powers of any two pieces of user equipment, and using the difference as a pairing parameter of the two pieces of user equipment. The first reference power is a reference power of data transmission performed between the base station and the user equipment.

A full name of the reference power is reference signal (Reference Signal) power. A reference signal is also called a pilot signal and is a signal that is provided by a transmit end for a receive end and that is used for channel estimation or channel detection, and the signal has a signal frequency.

When user equipment performs uplink data transmission, a base station side may measure an uplink transmit power to obtain a first reference power; or when user equipment performs downlink data transmission, the user equipment may measure a downlink transmit power to obtain a first reference power.

Therefore, the first reference power may also be divided into an uplink reference power and a downlink reference power. The base station side may perform policy selection to select one of the uplink reference power and the downlink reference power as the first reference power, and then determine a pairing set for the user equipment. The base station side may also use both the uplink reference power and the downlink reference power as the first reference power, and further determine an uplink pairing subset and a downlink pairing subset separately for the user equipment.

If the uplink reference power is used, the base station side may obtain the uplink reference power by measurement by receiving an uplink message of the user equipment.

If the downlink reference power is used, the downlink reference power may be acquired in two manners: one manner is that the base station side sends a downlink message to the user equipment, to trigger the user equipment to measure and report the downlink reference power; the other manner is that after obtaining the downlink reference power by measurement, the user equipment proactively reports the reference power, and specifically, reporting may be periodic or triggered by a condition.

In this embodiment, R is used to represent the first reference power, and a threshold $R_{threshold}$ is set. Assuming that first reference powers of UE1, UE2, . . . , and UEn are $R_1$, $R_2$, . . . $R_n$ respectively, differences between the first reference power of UE1 and the first reference powers of the other UEs are: $|R_1-R_2|$, . . . , $|R_1-R_n|$, respectively and if $|R_1-R_2|$ is less than or equal to $R_{threshold}$, the UE2 is configured into a pairing set of the UE1, and the other pieces of user equipment UE3, . . . , and UEn, are also configured in this way.

In an implementation manner, in 110, the determining a pairing set for each piece of user equipment in a cell may specifically include: acquiring a distance from each piece of user equipment in the cell to a base station to which the cell belongs, calculating a difference between distances from any two pieces of user equipment to the base station, and using the difference as a pairing parameter of the two pieces of user equipment.

Theoretically, a first reference power of user equipment relative to a base station decreases as a distance from the user equipment to the base station increases, that is, the distance $l_n$ from the user equipment to the base station is a function of the first reference power $R_n$, which may be denoted by $l_n=f(R_n)$. Therefore, the base station side may calculate a distance from each piece of user equipment to the base station according to an acquired first reference power of each piece of user equipment relative to the base station.

In this embodiment, a threshold $l_{threshold}$ is set. When a pairing set is configured for UE1, differences $|l_1-l_2|$, . . . , $|l_1-l_n|$ between the distances from UE1 to the base station and the distances from the other user equipment to the base station may be compared with the threshold $l_{threshold}$, and user equipment corresponding to a difference greater than or equal to the threshold is configured into a pairing set of UE1.

In an implementation manner, in 110, the determining a pairing set for each piece of user equipment in a cell may specifically include: acquiring an angle of arrival of each piece of user equipment in the cell and a distance from each piece of user equipment in the cell to a base station, calculating a distance between any two pieces of user equipment according to the angles of arrival and the distances to the base station, and using the distance as a pairing parameter of the two pieces of user equipment.

The base station side may acquire angles of arrival $\theta_1$, $\theta_2$, . . . $\theta_n$ of user equipment UE1, UE2, . . . , and UEn, and distances L1, L2, . . . , and Ln between the user equipment UE1, UE2, . . . , and UEn and the base station.

Figure 4:
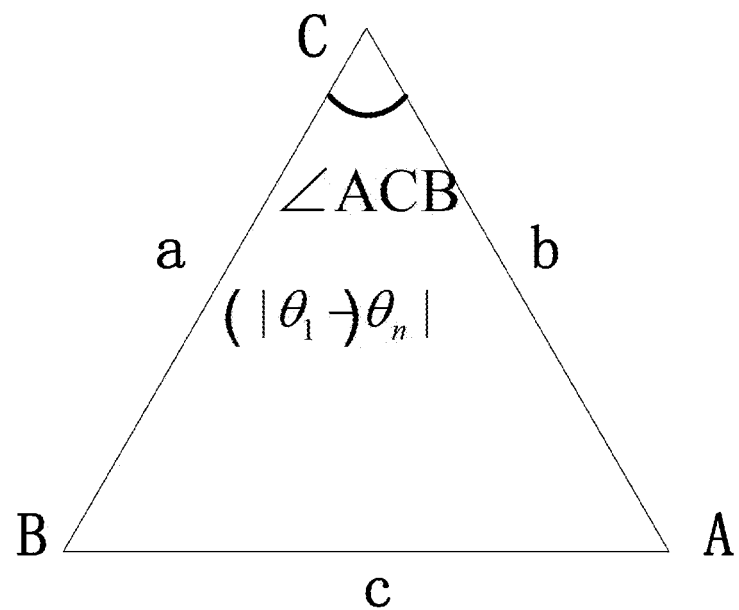
FIG. 4 is a schematic diagram of a triangle formed by two pieces of user equipment and a base station.

As shown in FIG. 4, two pieces of user equipment and a base station form a triangle denoted by $\triangle ABC$, where a vertex C is the base station, and vertexes A and B are the two pieces of user equipment. Assuming that a distance between B and C is a, a distance between A and C is b, and $\angle ACB$ is a difference between angles of arrival of the two pieces of user equipment and is denoted by $|\theta_1-\theta_n|$, a distance c between the two pieces of user equipment A and B may be calculated according to a triangle formula, that is, the distance between the two pieces of user equipment is: $L_{1ton}=L_1^2+L_n^2-2L_1L_n\cos(|\theta_1-\theta_n|)$.

In this embodiment, a distance between two pieces of user equipment is used as a pairing parameter, a threshold is set, and when a distance from a UE to UE1 is greater than or equal to the threshold, the UE is configured into a pairing set of UE1.

In an implementation manner, in 110, the determining a pairing set for each piece of user equipment in a cell may specifically include: acquiring a second reference power obtained by any piece of user equipment in the cell by measuring data transmission of another piece of user equipment, and using the second reference power as a pairing parameter. The second reference power is a reference power of data transmission performed between two pieces of user equipment.

When user equipment UE1 sends uplink data, all or some of other pieces of user equipment UE2, . . . , and UEn can receive a signal of UE1, obtain a reference power of UE1 by measurement, and locally record the reference power. In this specification, the reference power is denoted by the second reference power. Therefore, UE1 can obtain, by measurement, all or some of second reference powers of UE2, . . . , and UEn relative to UE1. Assuming that UE1 does not obtain a signal of UE2 within a period of time by measurement, it is considered that UE2 has left the cell or is far away from UE1, and information related to UE2 may be deleted from UE1, or a second reference power of UE2 relative to UE1 may be denoted by zero.

When a base station side acquires the second reference powers, the second reference powers may be acquired in the following manners: one manner is that the base station side sends a message to a UE, and after receiving the message of a base station, the UE returns a second reference power that is obtained by the UE by measurement and that is of another UE relative to the UE; another manner is that after a UE obtains, by measurement, a second reference power of another UE relative to the UE, the UE proactively reports the second reference power to the base station in a manner such as periodic reporting or reporting triggered by a condition; still another manner is that when the base station side schedules a UE to send uplink data, the UE first reports a second reference power that is obtained by the UE by measurement and that is of another UE relative to the UE.

In this embodiment, the pairing set may be configured in the following manners. For example, when a pairing set of UE1 is configured, if a second reference power of a UE relative to UE1 is not obtained by measurement, it is considered that the UE has left the cell or is far away from UE1, and the UE is configured into the pairing set of UE1; or if a second reference power of another UE relative to UE1 is less than or equal to a set threshold, the UE is configured into the pairing set of UE1.

In the foregoing implementation manners, examples are used to describe how a pairing parameter is designed and how a pairing set is determined according to the pairing parameter; however, the foregoing implementation manners are not exhaustive, there may be another implementation manner, and in addition, the implementation manners may be combined with each other for application.

For example, for the implementation manner in which the second reference power is used as the pairing parameter, the pairing set may also be configured in another manner. For example, when the pairing set of the UE1 is configured, if a second reference power of a UE relative to the UE1 is not obtained by measurement, it is considered that the UE has left the cell or is far away from the UE1, and the UE is configured into the pairing set of the UE1; for a UE whose a second reference power relative to the UE1 is obtained by measurement, the second reference power may not be used as the pairing parameter, and instead, a distance between the UE and the UE1 may be further calculated, and the distance between the UE and the UE1 is used as the pairing parameter to configure the pairing set of the UE1.

Figure 5:
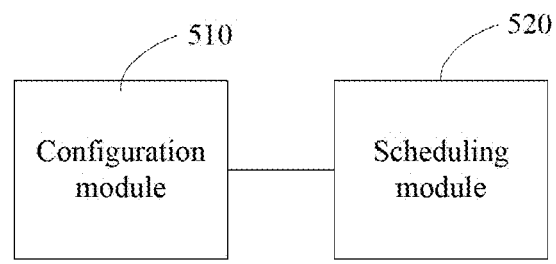
FIG. 5 is a schematic diagram of an apparatus for scheduling user equipment on a full-duplex cellular network according to an embodiment of the present invention.

Referring to FIG. 5, an embodiment of the present invention provides an apparatus for scheduling user equipment on a full-duplex cellular network. The apparatus includes a configuration module 510 configured to determine a pairing set for each piece of user equipment in a cell. A pairing parameter of the piece of user equipment and any piece of user equipment that is in the pairing set of the piece of user equipment meets a preset threshold. A scheduling module 520 is configured to select, when a piece of user equipment is scheduled to perform data transmission, another piece of user equipment from a pairing set of the piece of user equipment to perform data transmission in an opposite direction.

Figure 6:
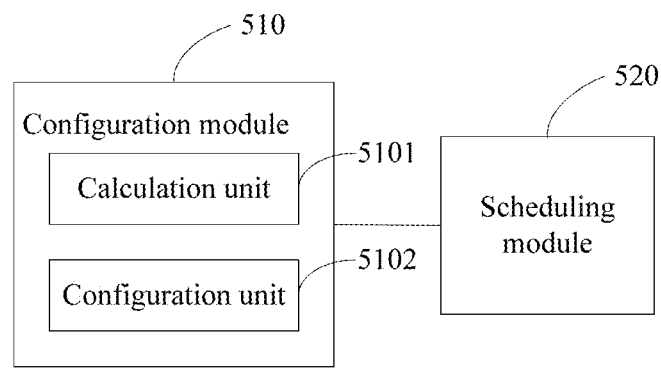
FIG. 6 is a schematic diagram of an apparatus for scheduling user equipment on a full-duplex cellular network according to another embodiment of the present invention.

In an implementation manner, the pairing set may include an uplink pairing subset and a downlink pairing subset; as shown in FIG. 6, the scheduling module 520 may be specifically configured to select another piece of user equipment from an uplink pairing subset of the piece of user equipment to perform uplink data transmission when a piece of user equipment is scheduled to perform downlink data transmission. Alternatively, the scheduling module 520 may be specifically configured to select another piece of user equipment from a downlink pairing subset of the piece of user equipment to perform downlink data transmission when a piece of user equipment is scheduled to perform uplink data transmission.

In another implementation manner, as shown in FIG. 6, the configuration module 510 may include a calculation unit 5101, configured to calculate a pairing parameter of any two pieces of user equipment. A configuration unit 5102 is configured to configure two pieces of user equipment whose pairing parameter meets the threshold into a pairing set of each other.

The calculation unit 5101 may be specifically configured to: acquire an angle of arrival of each piece of user equipment in the cell, calculate a difference between angles of arrival of any two pieces of user equipment, and use the difference as a pairing parameter of the two pieces of user equipment; or acquire a distance from each piece of user equipment in the cell to a base station, calculate a difference between distances from any two pieces of user equipment to the base station, and use the difference as a pairing parameter of the two pieces of user equipment; or acquire an angle of arrival of each piece of user equipment in the cell and a distance from each piece of user equipment in the cell to a base station, calculate a distance between any two pieces of user equipment according to the angles of arrival and the distances to the base station, and use the distance as a pairing parameter of the two pieces of user equipment.

Accordingly, the configuration unit 5102 may be specifically configured to configure two pieces of user equipment whose pairing parameter is greater than or equal to the threshold into a pairing set of each other.

The calculation unit 5101 may be further specifically configured to: acquire a first reference power of each piece of user equipment in the cell relative to the base station, calculate a difference between first reference powers of any two pieces of user equipment, and use the difference as a pairing parameter of the two pieces of user equipment; or acquire a second reference power that is obtained by any piece of user equipment in the cell by receiving a signal of another piece of user equipment and that is of the another piece of user equipment relative to the piece of user equipment, and use the second reference power as the pairing parameter.

Accordingly, the configuration unit 5102 may be specifically configured to configure two pieces of user equipment whose pairing parameter is less than or equal to the threshold into a pairing set of each other.

For functions and detailed execution procedures of the foregoing modules and units, reference may be made to the foregoing method embodiments.

In the foregoing description, this embodiment of the present invention provides an apparatus for scheduling user equipment on a full-duplex cellular network. The apparatus may configure a pairing set for a piece of user equipment, and when the piece of user equipment is scheduled to perform data transmission, another piece of user equipment may be selected from the pairing set of the piece of user equipment to perform data transmission in an opposite direction, so that existing spectrum resources can be utilized more thoroughly and spectrum utilization efficiency of wireless access can be improved.

Figure 7:
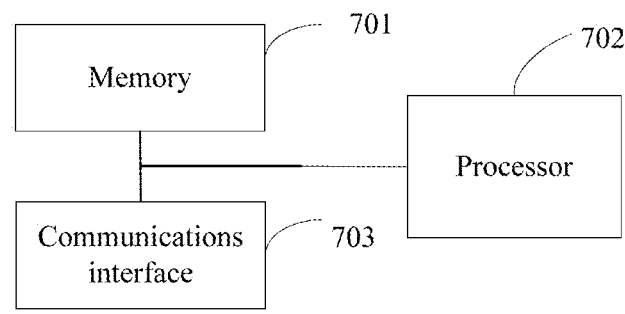
FIG. 7 is a schematic diagram of an apparatus for scheduling user equipment on a full-duplex cellular network according to still another embodiment of the present invention.

Referring to FIG. 7, an embodiment of the present invention provides an apparatus for scheduling user equipment on a full-duplex cellular network, including: a memory 701, a processor 702, a communications interface 703, and the like, where the memory 701, the processor 702, and the communications interface 703 may be connected by using a bus or in another manner. The processor 702 executes the following steps. A pairing set is determined for each piece of user equipment in a cell, where a pairing parameter of the piece of user equipment and any piece of user equipment that is in the pairing set of the piece of user equipment meets a preset threshold. When a piece of user equipment is scheduled to perform data transmission, another piece of user equipment is selected from a pairing set of the piece of user equipment to perform data transmission in an opposite direction.

The determining a pairing set for each piece of user equipment in a cell may include: calculating a pairing parameter of any two pieces of user equipment; and configuring two pieces of user equipment whose pairing parameter meets the threshold into a pairing set of each other.

If the pairing parameter includes an uplink pairing parameter and a downlink pairing parameter, the pairing set may include an uplink pairing subset determined according to the uplink pairing parameter and a downlink pairing subset determined according to the downlink pairing parameter; the selecting, when a piece of user equipment is scheduled to perform data transmission, another piece of user equipment from a pairing set of the piece of user equipment to perform data transmission in an opposite direction may include: when a piece of user equipment is scheduled to perform downlink data transmission, selecting another piece of user equipment from an uplink pairing subset of the piece of user equipment to perform uplink data transmission; or when a piece of user equipment is scheduled to perform uplink data transmission, selecting another piece of user equipment from a downlink pairing subset of the piece of user equipment to perform downlink data transmission.

In the foregoing description, this embodiment of the present invention provides an apparatus for scheduling user equipment on a full-duplex cellular network. The apparatus may configure a pairing set for a piece of user equipment, and when the piece of user equipment is scheduled to perform data transmission, another piece of user equipment may be selected from the pairing set of the piece of user equipment to perform data transmission in an opposite direction, so that existing spectrum resources can be utilized more thoroughly and spectrum utilization efficiency of wireless access can be improved.

Persons of ordinary skill in the art should understand that all or some of the steps of the methods in the foregoing embodiments may be implemented by a hardware or a program instructing relevant hardware. The program may be stored in a computer readable storage medium, such as a read only memory, a random access memory, a magnetic disk or an optical disc.

The foregoing describes in detail the method and apparatus for scheduling user equipment on a full-duplex cellular network; however, descriptions of the foregoing embodiments are merely intended to facilitate understanding of the method and core idea of the present invention, and shall not be construed as a limitation on the present invention. Various modifications and replacements that can be easily thought of by persons skilled in the art without departing from the technical scope of the present invention should be considered falling within the protection scope of the present invention.

What is claimed is:

1. A method for scheduling a plurality of user equipments on a full-duplex cellular network, wherein the method comprises:
   determining a pairing set for each user equipment of the plurality of user equipments in a cell, wherein a pairing parameter of the user equipment of the plurality of user equipments and any user equipment of the plurality of user equipments that is in the pairing set of the user equipment of the plurality of user equipments meets a preset threshold;
   wherein the pairing parameter comprises an uplink pairing parameter and a downlink pairing parameter, and the pairing set comprises an uplink pairing subset determined according to the uplink pairing parameter and a downlink pairing subset determined according to the downlink pairing parameter; and
   when the user equipment of the plurality of user equipments is scheduled to perform downlink data transmission, selecting an user equipment of the plurality of user equipments from the uplink pairing subset of the user equipment of the plurality of user equipments to perform uplink data transmission; or
   when the user equipment of the plurality of user equipments is scheduled to perform uplink data transmission, selecting an user equipment of the plurality of user equipments from the downlink pairing subset of the user equipment of the plurality of user equipments to perform downlink data transmission.

2. The method according to claim 1, wherein the step of determining a pairing set for each user equipment of the plurality of user equipments in a cell comprises:
   calculating a pairing parameter of any two user equipments of the plurality of user equipments; and
   configuring two user equipments of the plurality of user equipments whose pairing parameter meets the threshold into a pairing set of each other.

3. The method according to claim 2, wherein the step of calculating a pairing parameter of any two user equipments of the plurality of user equipments comprises:
   acquiring an angle of arrival of each user equipment of the plurality of user equipments in the cell,
   calculating a difference between angles of arrival of any two user equipment of the plurality of user equipments, and
   using the difference as a pairing parameter of the two user equipments of the plurality of user equipments;
   wherein the configuring two user equipments of the plurality of user equipments whose pairing parameter meets the threshold into a pairing set of each other comprises:
   configuring two user equipments of the plurality of user equipments whose pairing parameter is greater than or equal to the threshold into a pairing set of each other.

4. The method according to claim 2,
   wherein the step of calculating a pairing parameter of any two user equipments of the plurality of user equipments comprises:
   acquiring a distance from each user equipment of the plurality of user equipments in the cell to a base station to which the cell belongs,
   calculating a difference between distances from any two user equipments of the plurality of user equipments to the base station, and
   using the difference as a pairing parameter of the two user equipments of the plurality of user equipments;
   wherein the configuring two user equipments of the plurality of user equipments whose pairing parameter meets the threshold into a pairing set of each other comprises:
   configuring two user equipments of the plurality of user equipments whose pairing parameter is greater than or equal to the threshold into a pairing set of each other.

5. The method according to claim 2,
   wherein the step of calculating a pairing parameter of any two user equipments of the plurality of user equipments comprises:
   acquiring an angle of arrival of each user equipment of the plurality of user equipments in the cell and a distance from each user equipment of the plurality of user equipments in the cell to a base station,
   calculating a distance between any two user equipments of the plurality of user equipments according to the angles of arrival and the distances to the base station, and
   using the distance between the two user equipments of the plurality of user equipments as a pairing parameter of the two;
   wherein the configuring two user equipments of the plurality of user equipments whose pairing parameter meets the threshold into a pairing set of each other comprises:
   configuring two user equipments of the plurality of user equipments whose pairing parameter is greater than or equal to the threshold into a pairing set of each other.

6. The method according to claim 2,
   wherein the step of calculating a pairing parameter of any two user equipments of the plurality of user equipments comprises:
   acquiring a first reference power of each user equipment of the plurality of user equipments in the cell relative to a base station to which the cell belongs,
   calculating a difference between first reference powers of the any two user equipments of the plurality of user equipments, and
   using the difference as the pairing parameter of the two user equipments of the plurality of user equipments;
   wherein the configuring two user equipments of the plurality of user equipments whose pairing parameter meets the threshold into a pairing set of each other comprises:
   configuring two user equipments of the plurality of user equipments whose pairing parameter is less than or equal to the threshold into a pairing set of each other.

7. The method according to claim 2,
wherein the step of calculating a pairing parameter of any two user equipments of the plurality of user equipments comprises:
acquiring a second reference power that is obtained by any user equipment of the plurality of user equipments in the cell by receiving a signal of another user equipment of the plurality of user equipments and that is of the another user equipment of the plurality of user equipments relative to the user equipment of the plurality of user equipments, and
using the second reference power as the pairing parameter;
wherein the configuring two user equipments of the plurality of user equipments whose pairing parameter meets the threshold into a pairing set of each other comprises:
configuring two user equipments of the plurality of user equipments whose pairing parameter is less than or equal to the threshold into a pairing set of each other.

8. An apparatus, comprising: a memory, and a processor, wherein,
the memory is configured to store information that the processor executes a method for scheduling a plurality of user equipments on the full-duplex cellular network;
the processor is configured to execute the method, comprising steps of
determining a pairing set for each user equipment of the plurality of user equipments in a cell, where a pairing parameter of the and any user equipment of the plurality of user equipments that is in the pairing set of the user equipment of the plurality of user equipments meets a preset threshold;
wherein the pairing parameter comprises an uplink pairing parameter and a downlink pairing parameter, and the pairing set comprises an uplink pairing subset determined according to the uplink pairing parameter and a downlink pairing subset determined according to the downlink pairing parameter; and
when the user equipment of the plurality of user equipments is scheduled to perform downlink data transmission, selecting a user equipment of the plurality of user equipments from the uplink pairing subset of the user equipment of the plurality of user equipments to perform uplink data transmission; or
when the user equipment of the plurality of user equipments is scheduled to perform uplink data transmission, selecting a from the downlink pairing subset of the user equipment of the plurality of user equipments to perform downlink data transmission.

9. The apparatus according to claim 8, wherein the processor is further configured to execute steps of:
calculating a pairing parameter of any two user equipments of the plurality of user equipments; and
configuring two user equipments of the plurality of user equipments whose pairing parameter meets the threshold into a pairing set of each other.

10. The apparatus according to claim 9,
wherein the step of calculating a pairing parameter of any two user equipments of the plurality of user equipments comprises:
acquiring an angle of arrival of each user equipment of the plurality of user equipments in the cell,
calculating a difference between angles of arrival of any two user equipments of the plurality of user equipments, and
using the difference as a pairing parameter of the two user equipments of the plurality of user equipments;
wherein the configuring two user equipments of the plurality of user equipments whose pairing parameter meets the threshold into a pairing set of each other comprises:
configuring two user equipments of the plurality of user equipments whose pairing parameter is greater than or equal to the threshold into a pairing set of each other.

11. The apparatus according to claim 9,
wherein the step of calculating a pairing parameter of any two user equipments of the plurality of user equipments comprises:
acquiring a distance from each user equipment of the plurality of user equipments in the cell to a base station to which the cell belongs,
calculating a difference between distances from any two user equipments of the plurality of user equipments to the base station, and
using the difference as a pairing parameter of the two user equipments of the plurality of user equipments;
wherein the configuring two user equipments of the plurality of user equipments whose pairing parameter meets the threshold into a pairing set of each other comprises:
configuring two user equipments of the plurality of user equipments whose pairing parameter is greater than or equal to the threshold into a pairing set of each other.

12. The apparatus according to claim 9,
wherein the step of calculating a pairing parameter of any two user equipments of the plurality of user equipments comprises:
acquiring an angle of arrival of each user equipment of the plurality of user equipments in the cell and a distance from each user equipment of the plurality of user equipments in the cell to a base station,
calculating a distance between any two user equipments of the plurality of user equipments according to the angles of arrival and the distances to the base station, and
using the distance between the two user equipments of the plurality of user equipments as a pairing parameter of the two user equipments of the plurality of user equipments;
wherein the configuring two user equipments of the plurality of user equipments whose pairing parameter meets the threshold into a pairing set of each other comprises:
configuring two user equipments of the plurality of user equipments whose pairing parameter is greater than or equal to the threshold into a pairing set of each other.

13. The apparatus according to claim 9,
wherein the step of calculating a pairing parameter of any two user equipments of the plurality of user equipments comprises:
acquiring a first reference power of each user equipment of the plurality of user equipments in the cell relative to a base station to which the cell belongs,
calculating a difference between first reference powers of the any two user equipments of the plurality of user equipments, and
using the difference as the pairing parameter of the two user equipments of the plurality of user equipments;

wherein the configuring two user equipments of the plurality of user equipments whose pairing parameter meets the threshold into a pairing set of each other comprises:
configuring two user equipments of the plurality of user equipments whose pairing parameter is less than or equal to the threshold into a pairing set of each other.

14. The apparatus according to claim 9,
wherein the step of calculating a pairing parameter of any two user equipments of the plurality of user equipments comprises:
acquiring a second reference power that is obtained by any user equipment of the plurality of user equipments in the cell by receiving a signal of another user equipment of the plurality of user equipments and that is of the another user equipment of the plurality of user equipments relative to the user equipment of the plurality of user equipments, and
using the second reference power as the pairing parameter;
wherein the configuring two user equipments of the plurality of user equipments whose pairing parameter meets the threshold into a pairing set of each other comprises:
configuring two user equipments of the plurality of user equipments whose pairing parameter is less than or equal to the threshold into a pairing set of each other.

15. A non-transitory computer readable medium having a program stored thereon, the program comprising instructions for executing a method for scheduling a plurality of user equipments on a full-duplex cellular network, the method comprising:
determining a pairing set for each user equipment of the plurality of user equipments in a cell, wherein a pairing parameter of the user equipment of the plurality of user equipments and any user equipment of the plurality of user equipments that is in the pairing set of the user equipment of the plurality of user equipments meets a preset threshold;
wherein the pairing parameter comprises an uplink pairing parameter and a downlink pairing parameter, and the pairing set comprises an uplink pairing subset determined according to the uplink pairing parameter and a downlink pairing subset determined according to the downlink pairing parameter; and
when the user equipment of the plurality of user equipments is scheduled to perform downlink data transmission, selecting a user equipment of the plurality of user equipments from the uplink pairing subset of the user equipment of the plurality of user equipments to perform uplink data transmission; or
when the user equipment of the plurality of user equipments is scheduled to perform uplink data transmission, select a user equipment of the plurality of user equipments from the downlink pairing subset of the user equipment of the plurality of user equipments to perform downlink data transmission.

* * * * *